United States Patent
Quan

(10) Patent No.: US 11,290,543 B2
(45) Date of Patent: Mar. 29, 2022

(54) SCENE SWITCHING METHOD BASED ON MOBILE TERMINAL

(71) Applicant: TENCENT TECHNOLOGY (SHENZHEN) COMPANY LIMITED, Shenzhen (CN)

(72) Inventor: Wei Quan, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/356,596

(22) Filed: Mar. 18, 2019

(65) Prior Publication Data

US 2019/0215372 A1 Jul. 11, 2019

Related U.S. Application Data

(63) Continuation of application No. PCT/CN2017/117134, filed on Dec. 19, 2017.

(30) Foreign Application Priority Data

Dec. 22, 2016 (CN) .......................... 201611202023.6

(51) Int. Cl.
*H04L 29/08* (2006.01)
*A63F 13/42* (2014.01)
(Continued)

(52) U.S. Cl.
CPC ........ *H04L 67/142* (2013.01); *A63F 13/2145* (2014.09); *A63F 13/332* (2014.09);
(Continued)

(58) Field of Classification Search
CPC .... A63F 13/795; A63F 13/332; A63F 13/355; A63F 13/42; A63F 13/2145;
(Continued)

(56) References Cited

U.S. PATENT DOCUMENTS

2004/0229691 A1 11/2004 Kawai et al.
2007/0270226 A1* 11/2007 York ....................... A63F 13/48
463/43
(Continued)

FOREIGN PATENT DOCUMENTS

CN 103729558 A 4/2014
CN 104881230 A 9/2015
(Continued)

OTHER PUBLICATIONS

Bradygame, Grand Theft Auto V Guide, Mar. 31, 2016, https://archive.org/details/Grand.Theft.Auto.V.BRADYGAMES.Game. Guide/mode/2up, p. 6, 13, 58, 59, 200 (Year: 2016).*
(Continued)

*Primary Examiner* — Thomas J Dailey
(74) *Attorney, Agent, or Firm* — Anova Law Group, PLLC

(57) ABSTRACT

A scene switching method based on a mobile terminal is provided. The method includes receiving, by the mobile terminal, a first instruction by triggering a first virtual button in an application interface, the application interface displaying a first scene; outputting, by the mobile terminal, one or more identifiers of one or more to-be-selected operation objects based on the first instruction; and receiving, by the mobile terminal, a second instruction. The second instruction indicates a user selection of a first identifier from the one or more identifiers of the one or more to-be-selected operation objects, and the first identifier points to a first operation object. The method also includes switching, by the mobile terminal, the first scene displayed by the application interface to a second scene based on the second instruction, the second scene being a scene in which the first operation object is located.

17 Claims, 11 Drawing Sheets

(51) Int. Cl.
| | |
|---|---|
| *A63F 13/355* | (2014.01) |
| *A63F 13/332* | (2014.01) |
| *H04M 1/72427* | (2021.01) |
| *A63F 13/2145* | (2014.01) |
| *A63F 13/533* | (2014.01) |
| *A63F 13/822* | (2014.01) |
| *A63F 13/92* | (2014.01) |
| *G06F 3/0484* | (2013.01) |
| *H04L 67/142* | (2022.01) |
| *H04L 67/1095* | (2022.01) |

(52) U.S. Cl.
CPC ............ *A63F 13/355* (2014.09); *A63F 13/42* (2014.09); *A63F 13/533* (2014.09); *A63F 13/822* (2014.09); *A63F 13/92* (2014.09); *G06F 3/0484* (2013.01); *H04M 1/72427* (2021.01); *H04L 67/1095* (2013.01)

(58) Field of Classification Search
CPC ...... A63F 13/533; A63F 13/822; A63F 13/92; H04L 67/142; H04L 67/1095; H04M 1/72544; H04M 1/72427; G06F 3/0484
See application file for complete search history.

(56) References Cited

U.S. PATENT DOCUMENTS

| | | | | |
|---|---|---|---|---|
| 2010/0194702 | A1* | 8/2010 | Chen | G06F 3/0488 345/173 |
| 2013/0321472 | A1 | 12/2013 | Piemonte et al. | |
| 2015/0151205 | A1* | 6/2015 | Plummer | A63F 13/795 463/31 |
| 2015/0273328 | A1* | 10/2015 | Kruglick | G06T 15/20 463/42 |

FOREIGN PATENT DOCUMENTS

| | | |
|---|---|---|
| CN | 105159687 A | 12/2015 |
| CN | 105597310 A | 5/2016 |
| CN | 105607851 A | 5/2016 |
| CN | 105664487 A | 6/2016 |
| CN | 106598438 A | 4/2017 |

OTHER PUBLICATIONS

The World Intellectual Property Organization (WIPO) International Search Report for PCT/CN2017/117134 dated Mar. 16, 2018 6 Pages (including translation).

The State Intellectual Property Office of the People's Republic of China (SIPO) Office Action 1 for 201611202023.6 dated Mar. 26, 2018 12 Pages (including translation).

The State Intellectual Property Office of the People's Republic of China (SIPO) Office Action 2 for 201611202023.6 Jul. 2, 2018 9 Pages (including translation).

www.aipai.com, "Detailed explanation of four/one split attack strategy of character "Liu, Bang" in Wangzhe Rongyao", Nov. 10, 2016 (Nov. 10, 2016), Retrieved from the Internet: URL: https://v.qq.com/x/page/s0344wgpmh2.html. 2 Pages.

The Giraffe, "King glory Liu Bang skills detailed analysis Liu Bang is amazing?", Apr. 13, 2016 (Apr. 13, 2016), pp. 1-5, Retrieved from the Internet: URL: http://www.gao7.com/wzlm/detail-667332.shtm. 10 Pages (including translation).

Zimo, "Fly with me. King Glory Liu Bang Play analysis", Apr. 27, 2016 (Apr. 27, 2016), pp. 1-3, Retrieved from the Internet: URL: http://www.gamedog.cn/gonglue/20160427/1707489.html. 6 Pages (including translation).

* cited by examiner

SCENE SWITCHING METHOD BASED ON MOBILE TERMINAL

RELATED APPLICATIONS

This application is a continuation application of PCT Patent Application No. PCT/CN2017/117134, filed on Dec. 19, 2017, which claims priority to Chinese Patent Application No. 201611202023.6, filed with the Chinese Patent Office on Dec. 22, 2016 and entitled "SCENE SWITCHING METHOD BASED ON MOBILE TERMINAL AND MOBILE TERMINAL", the entire contents of both of which are incorporated herein by reference.

FIELD OF TECHNOLOGY

The present disclosure relates to the field of Internet technologies, and specifically to a scene switching method based on a mobile terminal.

BACKGROUND OF THE DISCLOSURE

With the rapid development of the Internet, there are increasingly more applications based on the Internet. With the rapid development of intelligent mobile terminals, many applications originally based on personal computers (PC) can be used on mobile terminals such as mobile phones.

A PC has a large screen, but a mobile terminal generally has a small screen. In addition, an application is operated by using a mouse on the PC, but an operation is performed on the mobile terminal by controlling a cursor by using a touching body such as a finger. Consequently, complexity of operating a same application on the mobile terminal becomes higher.

Operation complexity of some applications, especially some interaction applications requiring frequent interaction with a user, is higher when the applications are used on the mobile terminal. If intending to watch a scene in which another object is located, the user can only control an object operated by the user to move to the scene in which the another object is located based on movement of the scene. It is rather difficult to operate scene switching on the mobile terminal, and a scene cannot be rapidly switched.

SUMMARY

Embodiments of the present disclosure provide a scene switching method based on a mobile terminal and a mobile terminal, to reduce an interaction operation, thereby implementing a rapid switching of a scene.

A first aspect of the embodiments of the present disclosure provide a scene switching method based on a mobile terminal. The method includes receiving, by the mobile terminal, a first instruction by triggering a first virtual button in an application interface, the application interface displaying a first scene; outputting, by the mobile terminal, one or more identifiers of one or more to-be-selected operation objects based on the first instruction; and receiving, by the mobile terminal, a second instruction. The second instruction indicates a user selection of a first identifier from the one or more identifiers of the one or more to-be-selected operation objects, and the first identifier points to a first operation object. The method also includes switching, by the mobile terminal, the first scene displayed by the application interface to a second scene based on the second instruction, the second scene being a scene in which the first operation object is located.

A second aspect of the embodiments of the present disclosure provides a mobile terminal, including a memory and a processor coupled to the memory. The processor is configured to receive a first instruction by triggering a first virtual button in an application interface, the application interface displaying a first scene; and output one or more identifiers of one or more to-be-selected operation objects based on the first instruction; and receive a second instruction. The second instruction indicates a user selection of a first identifier from the one or more identifiers of the one or more to-be-selected operation objects, and the first identifier points to a first operation object. The processor is also configured to switch the first scene displayed by the application interface to a second scene based on the second instruction, the second scene being a scene in which the first operation object is located.

A third aspect of the embodiments of the present disclosure provides a scene switching device based on a mobile terminal, including:

a processor and a memory, the memory being configured to store program code and transmit the program code to the processor; and the processor being configured to perform, based on an instruction in the program code, the scene switching method based on a terminal according to the first aspect of the present disclosure.

A fourth aspect of the embodiments of the present disclosure provides a non-transitory computer-readable storage medium storing computer program instructions. The computer program instructions are executable by at least one processor to perform receiving a first instruction by triggering a first virtual button in an application interface, the application interface displaying a first scene; outputting one or more identifiers of one or more to-be-selected operation objects based on the first instruction; and receiving a second instruction. The second instruction indicates a user selection of a first identifier from the one or more identifiers of the one or more to-be-selected operation objects, and the first identifier points to a first operation object. The computer program instructions also cause the at least one processor to switch the first scene displayed by the application interface to a second scene based on the second instruction, the second scene being a scene in which the first operation object is located.

A fifth aspect of the embodiments of the present disclosure provides a computer program product including instructions, the computer program product, when run on a computer, causing the computer to perform the scene switching method based on a terminal according to the first aspect of the present disclosure.

A sixth aspect of the embodiments of the present disclosure provides a scene switching method based on a mobile terminal, including:

receiving, by the mobile terminal, a first instruction by triggering/selecting a first virtual button in an application interface, the application interface displaying a first scene;

outputting, by the mobile terminal, one or more identifiers of one or more to-be-selected operation objects based on the first instruction;

receiving, by the mobile terminal, a second instruction, the second instruction being used for instructing to select a first identifier from the one or more identifiers of the one or more to-be-selected operation objects, and the first identifier pointing to a first operation object; and switching, by the mobile terminal, the first scene displayed by the application interface to a second scene based on the second instruction, the second scene being a scene in which the first operation object is located.

It may be learned from the foregoing technical solutions that the embodiments of the present disclosure have the following advantages:

Compared with high complexity of operating an interactive application on a mobile terminal in the prior art, in the scene switching method based on a mobile terminal provided in the embodiments of the present disclosure, an identifier corresponding to an operation object that needs to be watched may be selected by using a virtual button in an application interface, and then an identifier is selected, so that the application interface displays a scene of the operation object to which the identifier points. A personalized interface is set and an interaction operation is reduced, thereby reducing operation complexity on the mobile terminal and implementing a rapid switching of the scene.

BRIEF DESCRIPTION OF THE DRAWINGS

To more explicitly explain technical solutions in embodiments of the present disclosure, accompanying drawings needed in describing the embodiments are briefly introduced in the following. Apparently, the following accompanying drawings are only some embodiments of the present disclosure, and persons skilled in the art can derive other accompanying drawings from the accompanying drawings without creative work.

DESCRIPTION OF EMBODIMENTS

Embodiments of the present disclosure provide a scene switching method based on a mobile terminal and a mobile terminal, to reduce an interaction operation, thereby implementing a rapid switching of a scene and reducing complexity of operating scene switching on the mobile terminal.

The following clearly and completely describes the technical solutions in the embodiments of the present disclosure with reference to the accompanying drawings in the embodiments of the present disclosure. Apparently, the described embodiments are merely some but not all of the embodiments of the present disclosure. In the specification, claims, and accompanying drawings of the present disclosure, the terms "first", "second", "third", "fourth", and the like (if existing) are intended to distinguish between similar objects rather than describe a specific order. It should be understood that the data used in such a way are interchangeable in proper cases so that the embodiments described herein can be implemented in other orders than the order illustrated or described herein. In addition, the terms "include", "have", and any other variant mean to cover the non-exclusive inclusion, for example, a process, method, system, product, or device that includes a series of steps or units is not necessarily limited to clearly listing those steps or units, but may include other steps or units not expressly listed or inherent to such a process, method, product, or device.

With the rapid development of the Internet, online arena games are becoming increasingly popular to the public, and MOBA games are especially popular.

A mouse may be used to perform an operation when the MOBA game is played on a computer. The computer has a large screen and the mouse is flexible, so that the operation may be usually performed accurately when the MOBA game is played on the computer. With the intelligent development of mobile terminals such as a mobile phone, many games may be operated on a mobile terminal and the MOBA game may also be operated on a mobile terminal. However, a mobile terminal generally has a small screen and generally, an operation needs to be performed by using a finger on a screen of a touchscreen. Consequently, the operation is often performed inaccurately and complexity of the operation is high.

Figure 1:
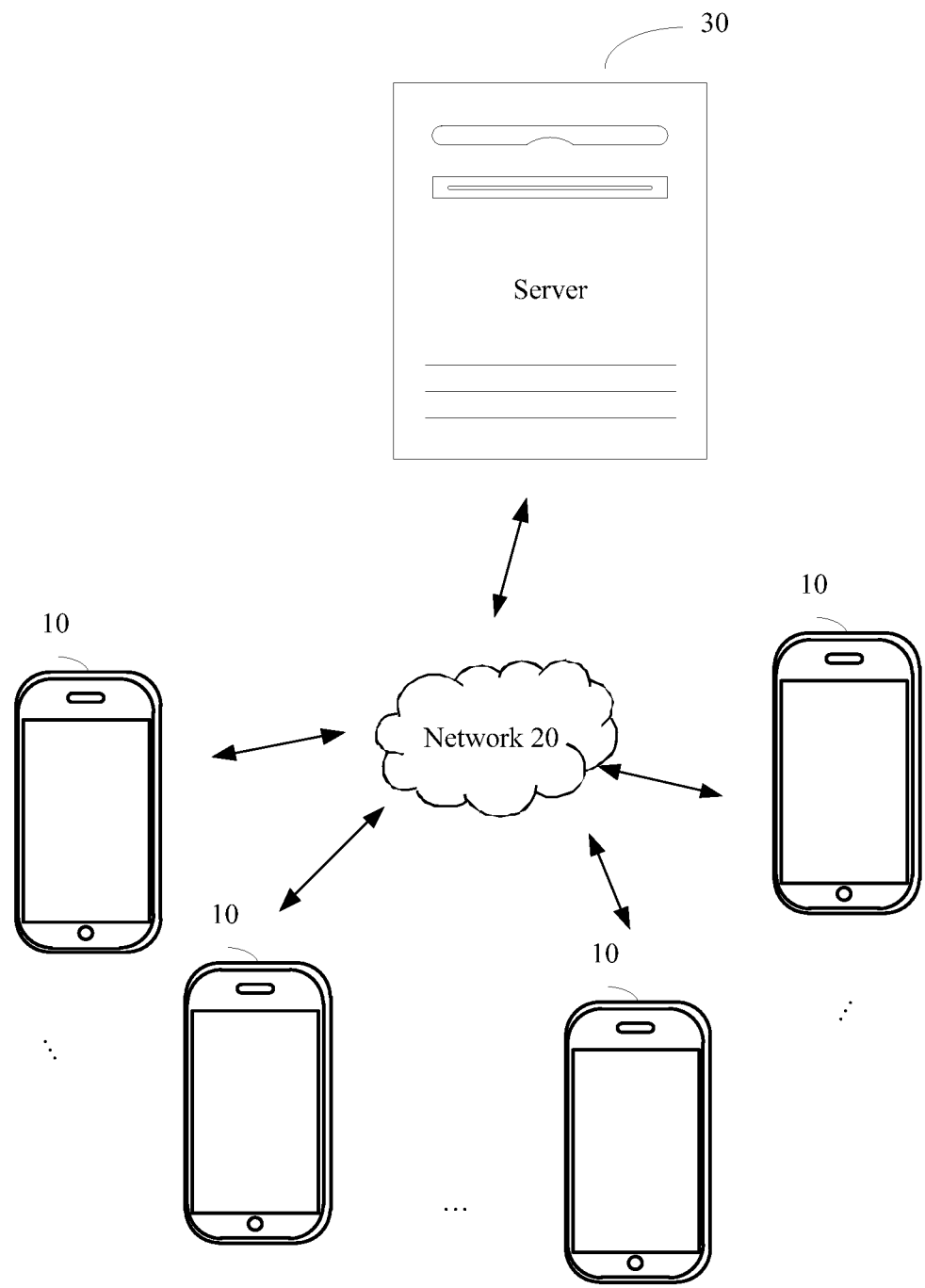
FIG. 1 is a schematic diagram of a page switching system based on a mobile terminal according to an embodiment of the present disclosure.

To resolve the problems of an inaccurate operation and high operation complexity of playing an MOBA game on a mobile terminal, an embodiment of the present disclosure provides a data processing system based on a mobile terminal. As shown in FIG. 1, the data processing system based on a mobile terminal includes multiple mobile terminals 10, a network 20, and a server 30. The mobile terminal 10 is in communication connection to the server 30 through the network 20. Each of the mobile terminals 10 is provided with an MOBA game, and a user plays the MOBA game online by using the mobile terminal 10 of the user together with another user.

An MOBA game on the mobile terminal restores the MOBA game at a computer side as much as possible. Many operation instructions of the MOBA game at the computer side need to be performed by clicking and selecting a designated operation object on which a spell is cast depending on a mouse. Such a clicking and selecting operation may further be subdivided into two types: one type is to click and select an operation object in a field of view of a main control character object, and the other type is to click and select an operation object out of the field of view of the main control character object. It is especially difficult to implement the latter on the mobile terminal. However, if the latter cannot be implemented, an important skill play depending on this operation cannot be crafted. Therefore, an embodiment of the present disclosure provides an operation manner of clicking and selecting the operation object out of the field of view of the main control character object based on the mobile terminal, so as to implement the skill play requiring the operation manner.

Specifically, in a game application interface of the MOBA game, when a user clicks on a virtual skill button, avatars of all operation objects that may be clicked and selected are popped up and listed beside the button. Subsequently, a finger slides to an avatar of an operation object to switch a viewing angle to a viewing angle of the operation object. The user observes a surrounding environment of the operation object, and if deciding to cast a skill on the operation object, the user loosens the finger. If deciding to switch to another operation object to observe, the user slides the finger to switch the avatar. If deciding to cancel casting a spell, the user moves the finger to a "cancel spell-casting" button.

In one embodiment of the present disclosure, the mobile terminal may include, but is not limited to, an intelligent device having a data processing capability, such as a mobile phone or a tablet computer.

In one embodiment of the present disclosure, an application interface (e.g., a graphical user interface rendering/presenting a game application) based on the mobile terminal may be an MOBA game interface. For example, a virtual button 100 is set in the application interface displaying a current scene (e.g., from a viewing angle directed to a character). The application maintains a global map that contains all resources and characters related to the current session (e.g., a game map for the current round of playing that includes all characters, backgrounds, and status of all objects involved in the game play). The size of the map is greater than the size of the application interface. In other words, a scene (e.g., game scene) shown on the application interface or the display screen of the mobile terminal is a part of the map (e.g., does not reflect the entire game map). The scene may be determined by the application based on different scenarios. For example, a game scene may present a surrounding area of a certain avatar/character based on certain viewing angle.

Figure 2:
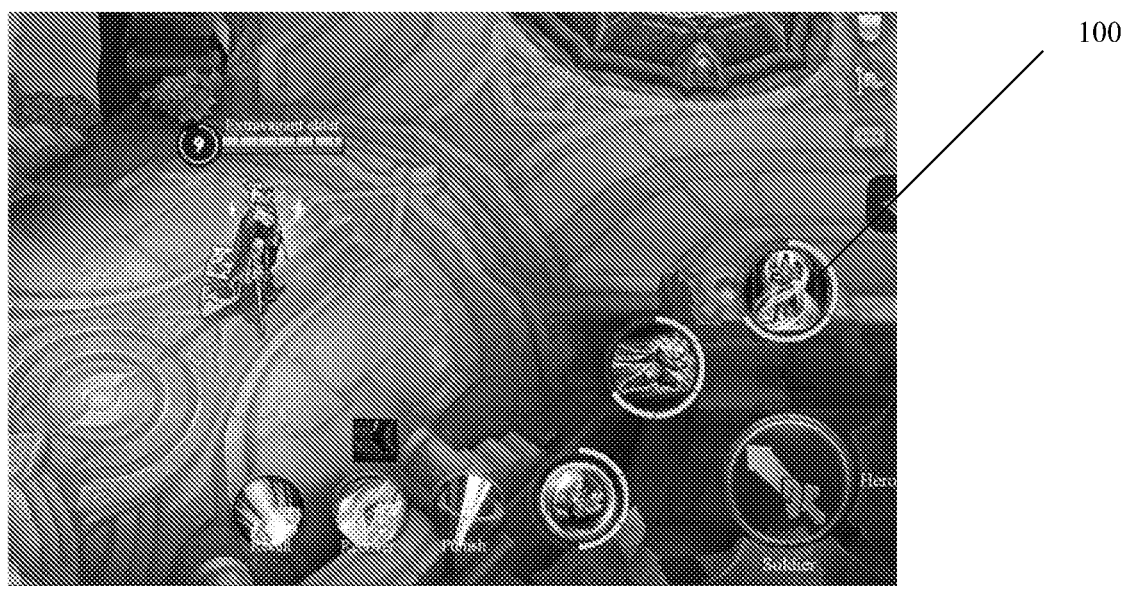
FIG. 2 is a schematic diagram of a scene of an application interface in a multiplayer online battle arena (MOBA) game according to an embodiment of the present disclosure.
Figure 3:
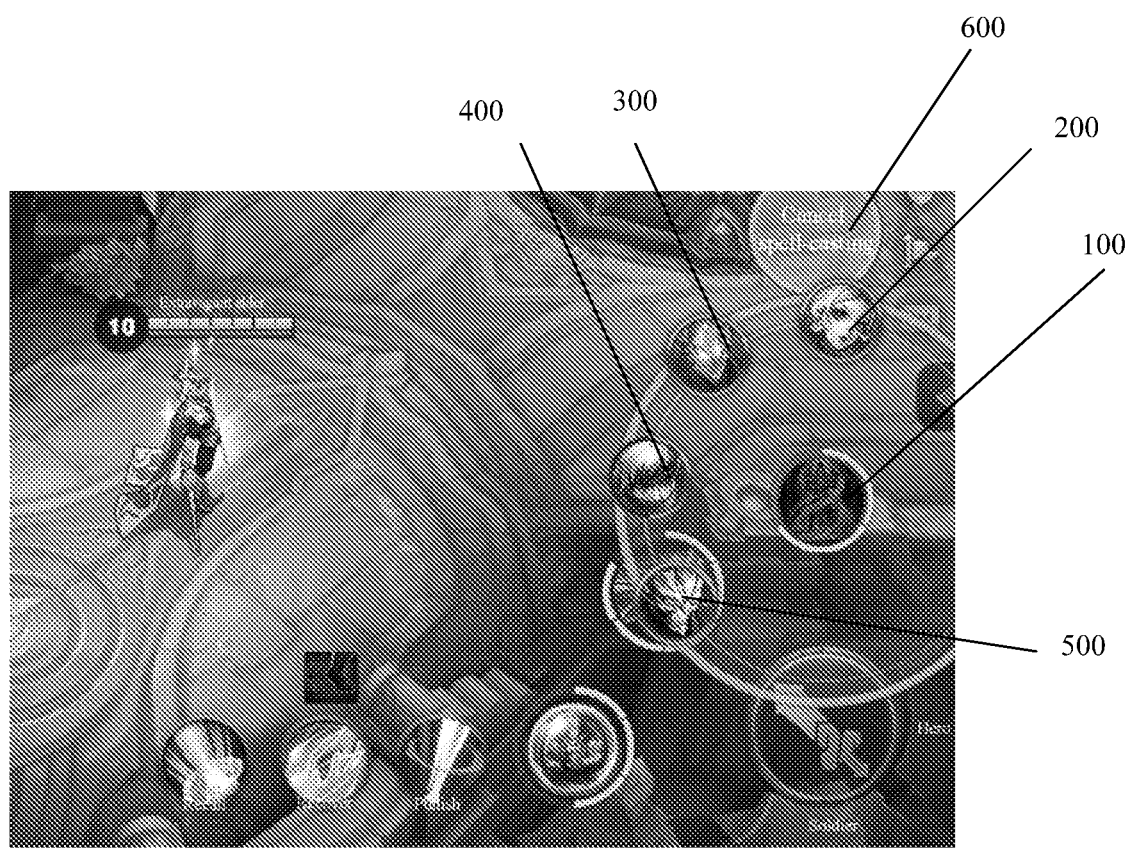
FIG. 3 is a schematic diagram of a scene of triggering a first virtual button according to an embodiment of the present disclosure.
Figure 4:
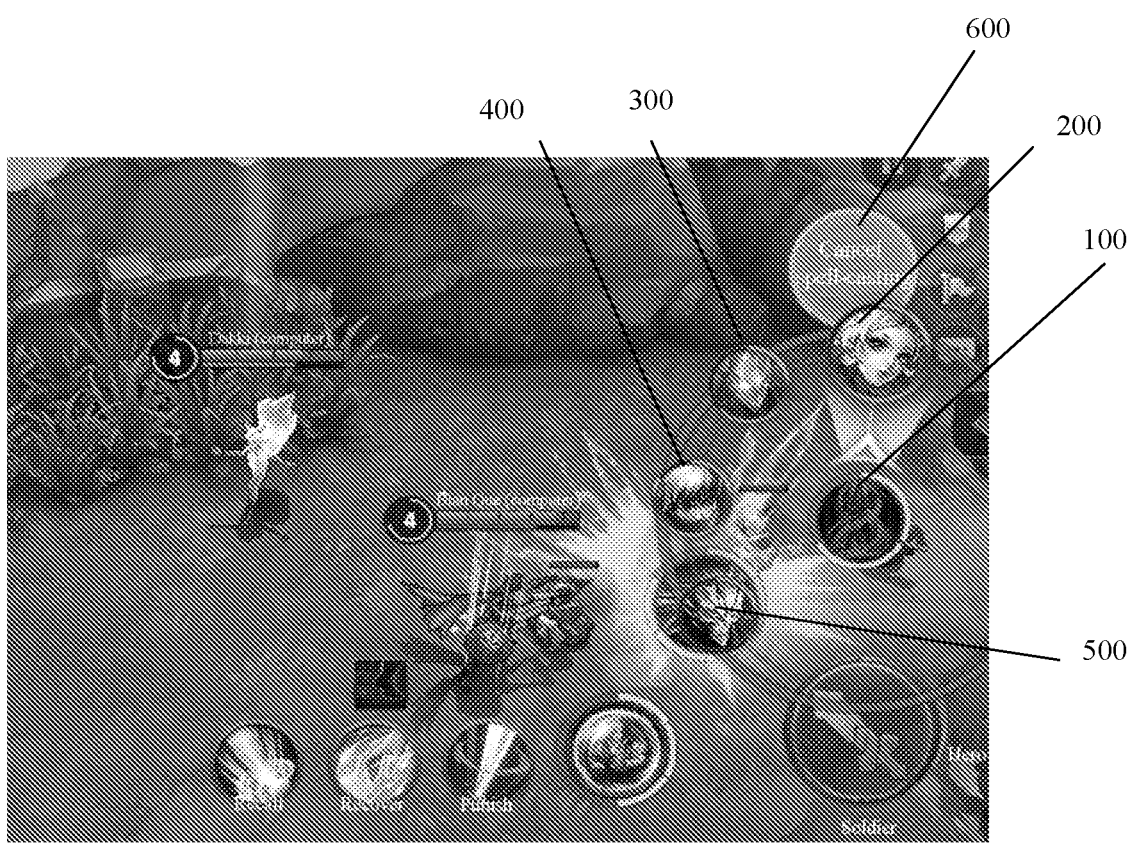
FIG. 4 is a schematic diagram of a scene of sliding to a second virtual button according to an embodiment of the present disclosure.
Figure 5:
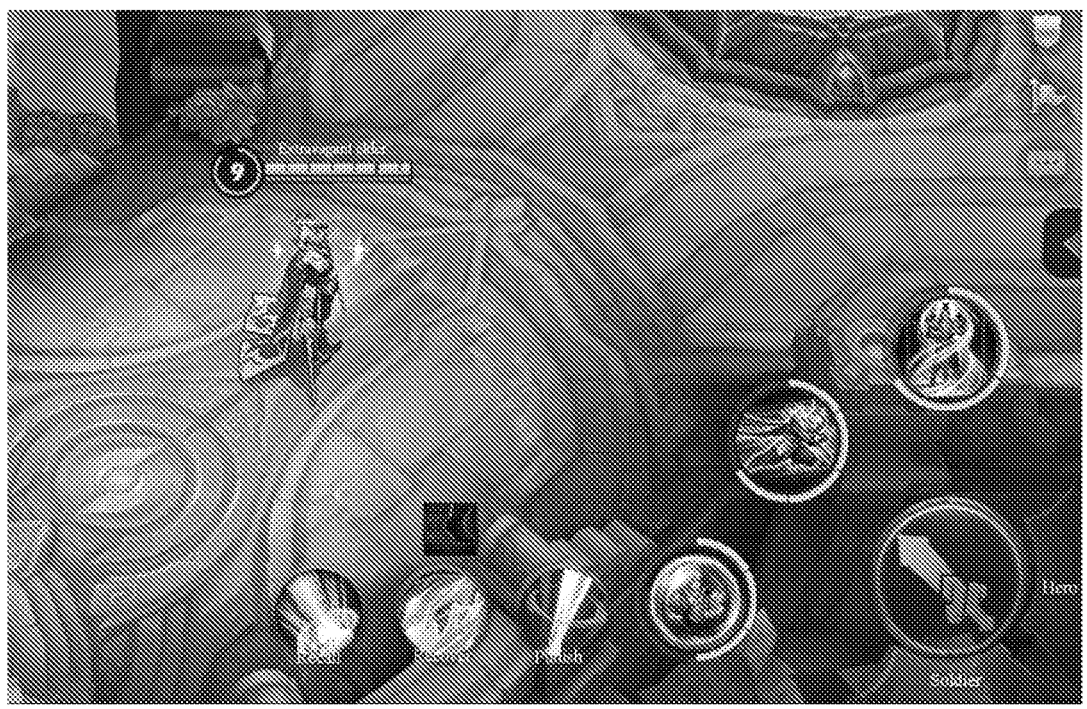
FIG. 5 is a schematic diagram of a scene of tapping a cancel button according to an embodiment of the present disclosure.
Figure 6:
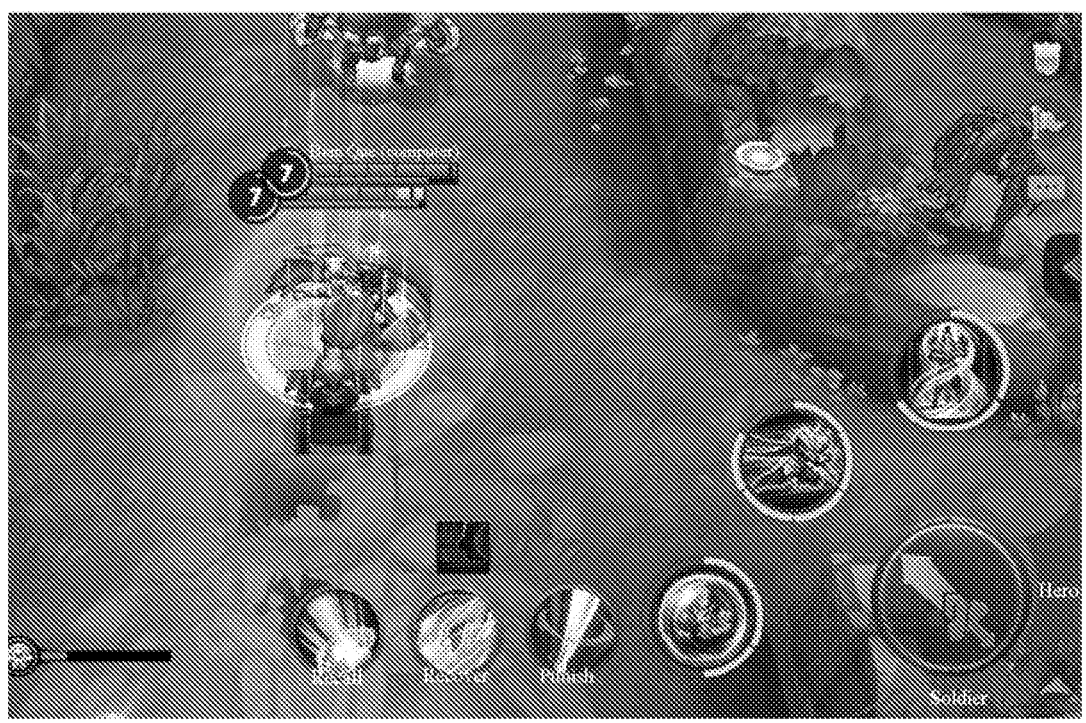
FIG. 6 is a schematic diagram of a scene of updating an attribute status value of a first operation object according to an embodiment of the present disclosure.

FIG. 2 is a schematic diagram of a scene of an application interface in a multiplayer online battle arena (MOBA) game. As shown in FIG. 2, the scene of the application interface presents surrounding area of the avatar "Extravagant elder" (e.g., a first part of the game map). The application interface may also present functional virtual buttons (such as recall, recover, punish, soldier, hero, etc.) and status indicators for game play. A user may select/trigger a virtual button 100 (e.g., for triggering a skill/action of the avatar "Extravagant elder" on certain target, such as casting a spell on a to-be-identified target). FIG. 3 is a schematic diagram of a scene of triggering a first virtual button. When the user touches and holds the virtual button 100, a first teammate avatar 200, a second teammate avatar 300, a third teammate avatar 400, and a fourth teammate avatar 500 in teammate avatars of a main control character object and a spell-casting cancel identifier 600 are listed beside the virtual button 100, as shown in FIG. 3. It can be understood that the teammate avatar may also any other suitable character/object existing in the game, such as an enemy avatar, a non-player character (NPC) avatar, etc. The user may select any of the teammate avatars 200, 300, 400, and 500, or select to stop current action by triggering identifier 600. FIG. 4 is a schematic diagram of a scene of sliding to a second virtual button. When the user slides a finger from the virtual button 100 to the teammate avatar 200, a viewing angle of a scene in the application interface is switched to a character scene of the selected teammate for convenience of observation, as shown in FIG. 4. In other words, the current scene shown on the application interface is adjusted to display surrounding area (e.g., a second part of the game map) of team avatar 200 (e.g., character "Dakki"). A display effect indicating the selected team avatar may also be presented on the application interface (e.g., a light beam on character "Dakki" and/or the character appears highlighted which indicates that the character is selected). It can be understood that the previous scene and the current scene may present entirely different areas of the game map (e.g., when the spell-casting character is located far away from the character that the spell is casted on) or may present certain overlapping area of the map (when the spell-casting character is located near the character that the spell is casted on). FIG. 5 is a schematic diagram of a scene of tapping a cancel button. When the user does not need or no longer needs to cast a spell by using a skill on the teammate, the user slides the finger to an identifier of "cancel spell-casting", as shown in FIG. 5. When the user loosens the finger, the spell is canceled, and the scene in the application interface is switched back to the scene in which the main control character of the user is located. FIG. 6 is a schematic diagram of a scene of updating an attribute status value of a first operation object. If the user selects a teammate avatar, observes a teammate character object (at the switched scene), and decides to cast the spell, the user loosens the finger and can cast the spell on the teammate character object, for example, adding hit points (e.g., health points), as shown in FIG. 6.

In one embodiment of the present disclosure, if the main control character object has only one teammate, when touching and holding the virtual button 100, there is no need to list an avatar of the teammate and the scene can be directly switched to a scene in which the teammate character object is located.

Figure 7:
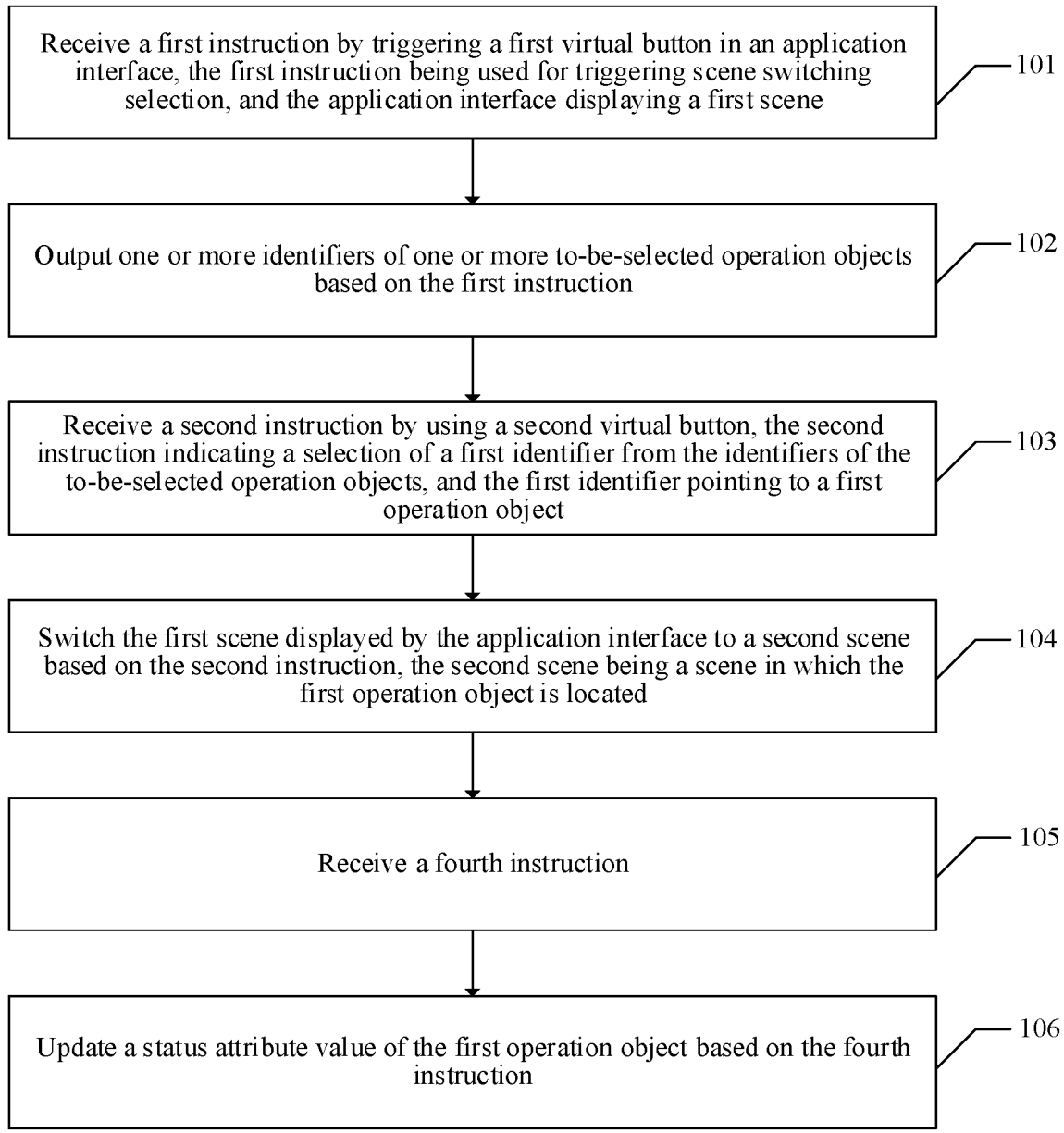
FIG. 7 is a schematic diagram of a scene switching method based on a mobile terminal according to an embodiment of the present disclosure.

Referring to FIG. 7, FIG. 7 is a schematic diagram of an embodiment of a scene switching method based on a mobile terminal according to the embodiments of the present disclosure. An execution body of steps shown in FIG. 7 is a mobile terminal, and the scene switching method based on a mobile terminal specifically includes the following steps.

101: Receive a first instruction by triggering a first virtual button in an application interface, the first instruction being used for triggering scene switching selection, and the application interface displaying a first scene.

The application interface may be the MOBA game application interface shown in FIG. 2. The first virtual button may be the virtual button 100 shown in FIG. 2. The first virtual button may be specifically a skill button for casting a spell on a teammate. The first instruction may be that a user touches and holds the first virtual button, that is, the user can trigger a scene switching selection instruction by touching and holding the first virtual button.

102: Output one or more identifiers of one or more to-be-selected operation objects based on the first instruction.

After receiving the first instruction representing performing scene switching selection, the mobile terminal outputs the one or more identifiers of the one or more to-be-selected operation objects. Teammate avatars such as the teammate avatar 200 are included in FIG. 3 described above. The one or more identifiers of the one or more to-be-selected operation objects may be specifically the teammate avatars.

103: Receive a second instruction, the second instruction indicating a selection of a first identifier from the one or more identifiers of the one or more to-be-selected operation objects, and the first identifier pointing to a first operation object.

As shown in FIG. 4, the user selects the teammate avatar 200 (e.g., an icon of character "Dakki") from multiple teammate avatars, and the selected teammate avatar 200 is an identifier of the first operation object. The second instruction may be an instruction that is triggered when the user slides a finger from the first virtual button, that is, the virtual button 100, to the teammate avatar 200 and touches and holds the teammate avatar 200.

104: Switch the first scene displayed by the application interface to a second scene based on the second instruction, the second scene being a scene in which the first operation object is located.

After receiving an instruction indicating that the user selects an identifier of the first operation object, the mobile terminal switches the first scene displayed by the application interface to the second scene in which the first operation object is located. That is, as shown in FIG. 4, after the user selects the teammate avatar 200, the mobile terminal switches a viewing angle scene to a scene in which a character object of the selected teammate is located. In some embodiments, the character object may move or perform other actions on the game map. The second scene shown on the application interface may also move or adjust based on the movement or the other actions of the character object.

It should be noted that if the user does not need to perform an operation, for example, casting a spell by using a skill, on the selected teammate, the user may slide a finger to another teammate avatar to observe an actual status of the another teammate.

It should be noted that if the user does not need to cast a spell by using a skill on a teammate, the user may slide the finger to a virtual identifier of "cancel spell-casting", and a main control viewing angle is restored to the first scene after the user loosens the finger.

Therefore, in one embodiment of the present disclosure, the mobile terminal may alternatively receive a third instruction by using a third virtual button in the application interface, the third instruction indicating a selection to cancel processing on the first operation object.

The second scene displayed by the application interface is switched to the first scene based on the third instruction.

The third virtual button may be the virtual identifier of "cancel spell-casting", and the third instruction may be an operation instruction triggered when the user slides the finger to the virtual identifier of "cancel spell-casting".

It should be noted that one embodiment of the present disclosure may further include the following steps, and an execution body of the following steps is the mobile terminal.

105: Receive a fourth instruction.

When the user needs to cast a spell by using a skill on a teammate, after switching a scene to a scene in which a teammate character object is located, the mobile terminal triggers the fourth instruction, so as to cast the spell by using the skill on the teammate. The fourth instruction may be an instruction indicating that the user loosens the finger at the first identifier.

106: Update a status attribute value of the first operation object based on the fourth instruction.

As shown in FIG. 6, when the user loosens the finger, the mobile terminal starts to cast the spell by using a skill on the teammate, so that the mobile terminal updates the status attribute value of the first operation object based on an attribute of the skill, for example, adding hit points. In FIG. 6, the character behind "Bian Que" is "Dakki." Adding hit points may refer to increasing a damage value that the character (e.g., "Dakki") causes on a target (e.g., "Bian Que"). It can be understood that other status attribute value of the first operation object may be changed as an effect of the spell, such as increasing life points, increasing mana points, decreasing damages caused by another character by certain percentage, increasing experience points by certain percentage, etc. In some embodiments, the second scene of the application interface may further present an effect corresponding to the updating of the attribute value. For example, a progress status bar on top of a character as shown in FIG. 6 may be gradually/instantly filled or unfilled based on the updated value of the attribute value. For example, a halo may cover the first operation object indicating that spell-casting is in effect.

In some embodiments, casting the spell by using the skill (e.g., after triggering the first virtual button and/or after selecting the first operation object) is a process, and a spell-casting process may require certain time to activate or may last certain time as spell effective period (e.g., approximately several seconds). In some embodiments, during the spell-casting process, the status attribute value of the first operation object may be updated at certain time interval. For example, the spell-casting process lasts 3 seconds, the mana points of the first operation object may be increased by 6 per 0.5 second. In some embodiments, during the entire spell-casting process, the status attribute value of the first operation object may equal to an updated value. For example, the spell-casting process lasts 3 seconds, the defense attribute value of the first operation object is always 10 points above the original value such that any damage received by the first operation object during the 3 seconds is decreased. In the spell-casting process, that is, in a process of updating the status attribute value of the first operation object, if the user does not intend to cast or to continue casting the spell on the teammate, the user may tap the virtual button of "cancel spell-casting" in the application interface, so that the mobile terminal stops updating the status attribute value of the first operation object.

Therefore, in one embodiment of the present disclosure, in a possible implementation, the mobile terminal may also receive a fifth instruction by using a second virtual button in the application interface. The fifth instruction is an instruction instructing to tap the second virtual button, and the fifth instruction is used for instructing to stop updating the status attribute value of the first operation object.

The mobile terminal stops updating the status attribute value of the first operation object based on the fifth instruction.

In the meantime of stopping updating the status attribute value, the mobile terminal switches the second scene displayed by the application interface to the first scene based on the fifth instruction.

The second virtual button is, for example, the virtual button of "cancel spell-casting". When the virtual button is triggered, the mobile terminal stops updating the status attribute value of the first operation object; and when the virtual button is triggered, the mobile terminal may also switch the main control viewing angle scene to the first scene in which the main control character object is located.

It may be understood that, in a process in which the mobile terminal updates a status attribute value of a character object of a teammate of the main control character object, the main control character object or the teammate character object may die, in this case, the mobile terminal cannot continue casting the spell and should stop casting the spell.

Therefore, in one embodiment of the present disclosure, in a possible implementation, when remaining hit points of the first operation object are zero or remaining hit points of the control object (e.g., the character that casts the spell, such as "Extravagant elder" in FIG. 2) of the mobile terminal are zero, the mobile terminal stops updating the status attribute value of the first operation object. In another possible implementation, when the remaining hit points of the first operation object are zero or the remaining hit points of the control object of the mobile terminal are zero, the mobile terminal may switch the second scene displayed by the application interface to the first scene.

It should be noted that, before updating the status attribute value of the first operation object, the mobile terminal may first perform the following steps:

sending synchronization data to a server, so that the server performs a check based on the synchronization data; and receiving a confirmation instruction sent by the server, the confirmation instruction indicating that the synchronization data passes the check performed by the server. In some embodiments, in response to receiving the confirmation instruction, the mobile terminal performs the step of updating the status attribute value of the first operation object.

As shown in FIG. 1, the MOBA game needs to ensure consistency of data of each player. Therefore, the data of the player may be transferred to another player by using the server 30. That is, game data on a mobile terminal 10 is forwarded to another mobile terminal by using the server 30. However, to prevent some players from maliciously modifying the data and some game roles from having an extremely high skill, the server 30 is configured to: not only transfer the game data, but also check the synchronization data sent by the mobile terminals 10. The synchronization data is generally sent by the mobile terminals 10 in a form of a frame. The server checks the synchronization frame. When data in the synchronization frame satisfies a preset game rule, the synchronization frame is delivered to each mobile terminal 10. The mobile terminal 10 renders the data in the synchronization frame for displaying.

Check of the server 30 may further ensure that a command is prevented from being repeatedly executed when a network is poor and an operation is repeatedly performed.

In one embodiment of the present disclosure, compared with high complexity of operating an interactive application on a mobile terminal in the prior art, in the scene switching method based on a mobile terminal provided in one embodiment of the present disclosure, an identifier corresponding to an operation object that needs to be watched may be selected by using a virtual button in an application interface, and then an identifier is selected, so that the application interface displays a scene of the operation object to which the identifier points. A personalized interface is set and an interaction operation is reduced, thereby reducing operation complexity on the mobile terminal and implementing a rapid switching of the scene.

Figure 8:
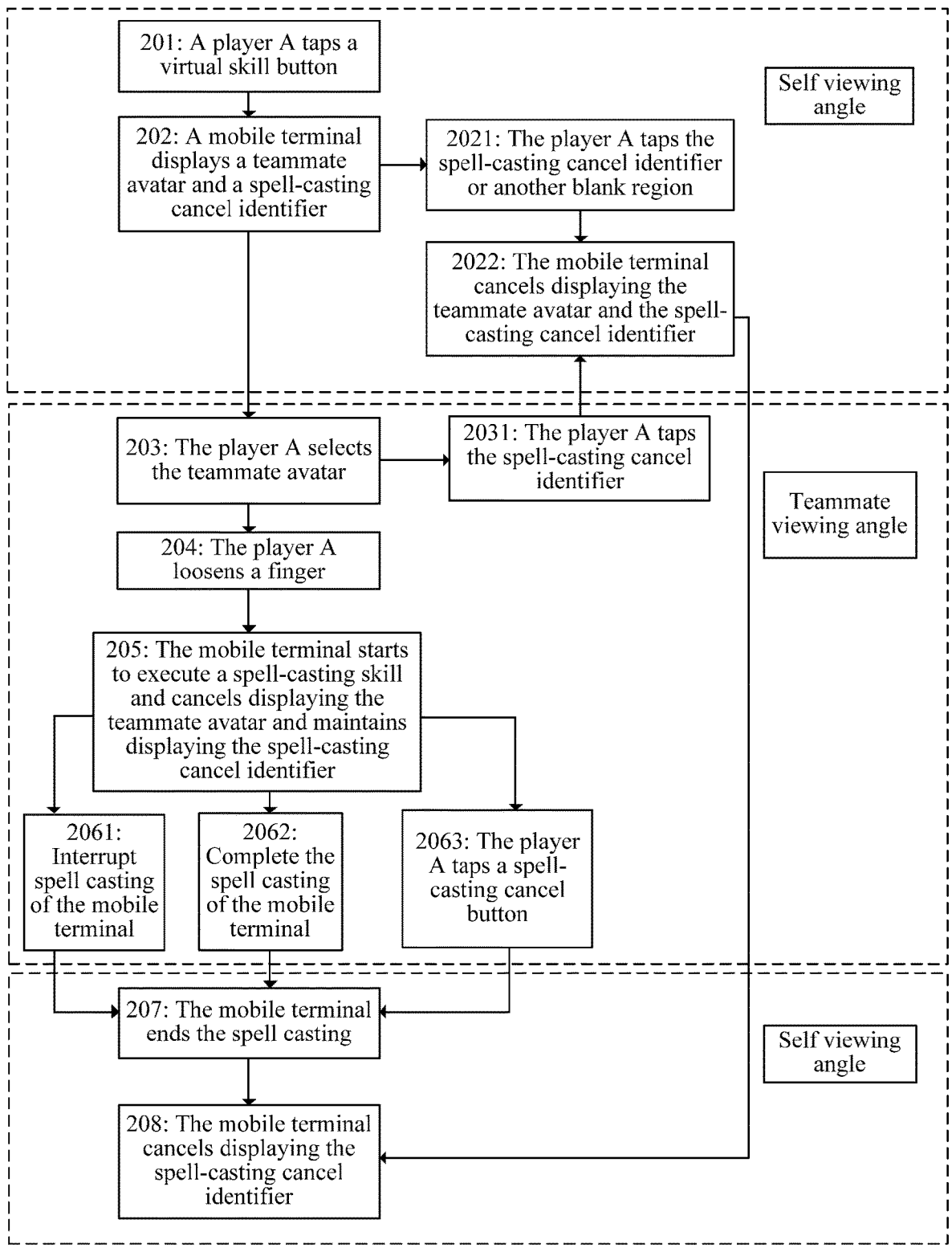
FIG. 8 is another schematic diagram of a scene switching method based on a mobile terminal according to an embodiment of the present disclosure.

Referring to FIG. 8, FIG. 8 is another schematic diagram of an embodiment of a scene switching method based on a mobile terminal according to the embodiments of the present disclosure, and the scene switching method based on a mobile terminal specifically includes the following steps.

201: A player A taps a virtual skill button.

202: A mobile terminal displays a teammate avatar and a spell-casting cancel identifier.

2021: The player A taps the spell-casting cancel identifier or another blank region.

It should be noted that, after the player A taps the virtual skill button, the mobile terminal displays teammate avatar and the spell-casting cancel identifier. If the player A does not intend to cast a spell on the teammate or does not intend to continue observing a status of the teammate, the player A may exit a current status by tapping the spell-casting cancel identifier, or may exit a current status by tapping other blank regions than the teammate avatar.

2022: The mobile terminal cancels displaying the teammate avatar and the spell-casting cancel identifier, to proceed to step 208.

203: The player A selects the teammate avatar.

Figure 9:
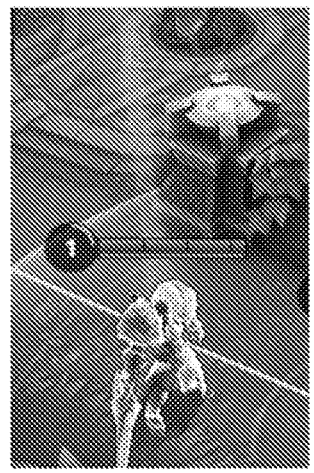
FIG. 9 is a schematic diagram of a selection special effect appearing after a teammate is selected according to an embodiment of the present disclosure.

It should be noted that, in a possible implementation of one embodiment, when the player A selects a teammate avatar (e.g., an icon representing the teammate), the selected teammate enters a locking state. A frame is added to the teammate avatar in the state, a selection special effect occurs on the teammate, and a model is highlighted. As shown in FIG. 9, FIG. 9 is a schematic diagram of a selection special effect appearing when a teammate is selected.

2031: The player A taps the spell-casting cancel identifier, to proceed to step 2022.

204: The player A loosens a finger.

205: The mobile terminal starts to execute a spell-casting skill and cancels displaying the teammate avatar and maintains displaying the spell-casting cancel identifier.

2061: Interrupt spell casting of the mobile terminal.

2062: Complete the spell casting of the mobile terminal.

2063: The player A taps a spell-casting cancel button.

207: The mobile terminal ends the spell casting.

208: The mobile terminal cancels displaying the spell-casting cancel identifier.

Figure 10:
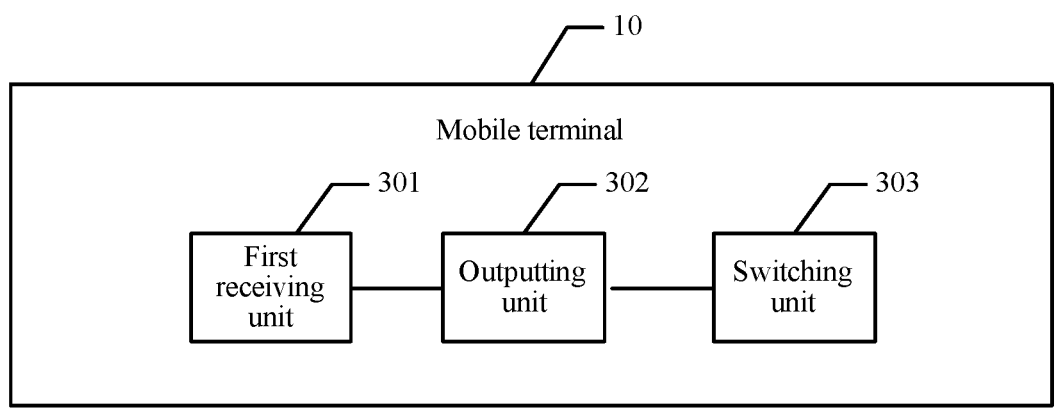
FIG. 10 is a schematic diagram of a mobile terminal according to an embodiment of the present disclosure.

Referring to FIG. 10, an embodiment of the mobile terminal 10 according to the embodiments of the present disclosure includes:

a first receiving unit 301, configured to receive a first instruction by triggering a first virtual button in an application interface, the application interface displaying a first scene;

an output unit 302, configured to output identifiers of to-be-selected operation objects based on the first instruction, the first receiving unit 301 being further configured to receive a second instruction, the second instruction indicating a selection of a first identifier from the identifiers of the to-be-selected operation objects, and the first identifier pointing to a first operation object; and a switching unit 303, configured to switch the first scene displayed by the application interface to a second scene based on the second instruction, the second scene being a scene in which the first operation object is located.

In a possible implementation, the first receiving unit 301 is further configured to:

receive a third instruction after the first scene displayed by the application interface is switched to a second scene based on the second instruction, the third instruction indicating a selection to cancel processing on the first operation object; and the switching unit 303 is further configured to switch the second scene displayed by the application interface to the first scene based on the third instruction.

Referring to FIG. 10, another embodiment of the mobile terminal 10 provided in the embodiments of the present disclosure further includes: Optionally, the first receiving unit 301 is further configured to:

receive a fourth instruction after the first scene displayed by the application interface is switched to a second scene based on the second instruction.

The mobile terminal 10 further includes:

an updating unit 304, configured to update a status attribute value of the first operation object based on the fourth instruction.

In another possible implementation, the first receiving unit 301 is further configured to:

receive a fifth instruction by using a second virtual button in the application interface when the updating unit 304 updates the status attribute value of the first operation object based on the fourth instruction, the fifth instruction indicating a selection to stop updating the status attribute value of the first operation object.

The mobile terminal 10 further includes:

a stopping unit 305, configured to stop updating the status attribute value of the first operation object based on the fifth instruction.

The stopping unit 305 is further configured to switch the second scene displayed by the application interface to the first scene based on the fifth instruction.

The stopping unit 305 is further configured to stop updating the status attribute value of the first operation object when the updating unit 304 updates the status attribute value of the first operation object based on the fourth instruction and remaining hit points of the first operation object are zero or remaining hit points of a control object of the mobile terminal are zero.

The stopping unit 305 is further configured to switch the second scene displayed by the application interface to the first scene when the remaining hit points of the first operation object are zero or the remaining hit points of the control object of the mobile terminal are zero.

In a possible implementation, before the updating unit 304 updates the status attribute value of the first operation object based on the fourth instruction, the mobile terminal 10 further includes:

a sending unit 306, configured to send synchronization data to a server, so that the server performs a check based on the synchronization data; and a second receiving unit 307, configured to receive a confirmation instruction sent by the server, the confirmation instruction indicating that the synchronization data passes the check performed by the server.

For understanding of the mobile terminal provided in the embodiments of the present disclosure, refer to descriptions in FIG. 1 to FIG. 8, and details are not described herein again.

Figure 12:
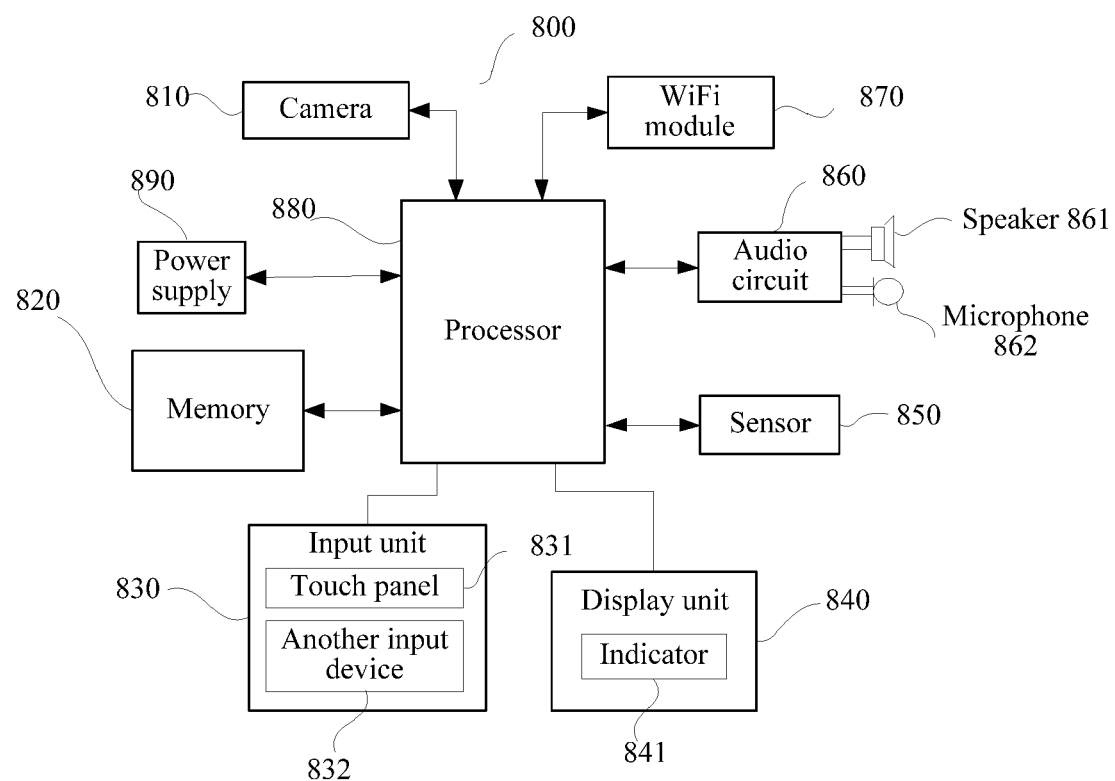
FIG. 12 is a schematic diagram of a part of a structure of a mobile terminal according to an embodiment of the present disclosure.

An embodiment of the present disclosure further provides another mobile terminal, and the mobile terminal may be a mobile phone. As shown in FIG. 12, for ease of description, only parts related to the embodiments of the present disclosure are shown. For specific technical details that are not disclosed, refer to the method part in the embodiments of the present disclosure.

FIG. 12 is a block diagram of a part of a structure of a mobile terminal 800 according to an embodiment of the present disclosure. Referring to FIG. 12, the mobile terminal includes components such as a camera 810, a memory 820, an input unit 830, a display unit 840, a sensor 850, an audio circuit 860, a WiFi module 870, a processor 880, and a power supply 890. Persons skilled in the art may understand that, the structure of the mobile terminal shown in FIG. 12 does not constitute a limitation to the mobile terminal, and the mobile terminal may include more components or fewer components than those shown in the figure, or some components may be combined, or a different component deployment may be used.

The following makes specific description of components of the mobile terminal with reference to FIG. 12.

The camera 810 may be configured to photograph.

The memory 820 may be configured to store a software program and module. The processor 880 runs the software program and module stored in the memory 820, to implement various functional applications and data processing of the mobile terminal. The memory 820 may mainly include a program storage area and a data storage area. The program storage area may store an operating system, an application program required by at least one function (such as a sound playback function and an image playback function), and the like. The data storage area may store data (such as audio data and an address book) created based on use of the mobile terminal, and the like. In addition, the memory 820 may include a high speed random access memory, and may also include a non-volatile memory, such as at least one magnetic disk storage device, a flash memory, or another volatile solid-state storage device.

The input unit 830 may be configured to receive an operation instruction of a user, for example, inputting scanning instruction, and generating a key signal input related to user setting and function control of the mobile terminal 800. Specifically, the input unit 830 may include a touch panel 831 and another input device 832. The touch panel 831, also referred to as a touchscreen, may collect a touch operation of the user on or near the touch panel (such as an operation of a user on or near the touch panel 831 by using any suitable object or accessory such as a finger or a stylus), and drive a corresponding connection mobile terminal based on a preset program. Optionally, the touch panel 831 may include two parts: a touch detection mobile terminal and a touch controller. The touch detection mobile terminal detects a touch position of the user, detects a signal generated by the touch operation, and transfers the signal to the touch controller. The touch controller receives touch information from the touch detection mobile terminal, converts the touch information into touch point coordinates, and sends the touch point coordinates to the processor 880. Moreover, the touch controller can receive and execute a command sent by the processor 880. In addition, the touch panel 831 may be a resistive, capacitive, infrared, or surface sound wave type touch panel. In addition to the touch panel 831, the input unit 830 may further include the another input device 832. Specifically, the another input device 832 may include, but is not limited to, one or more of a physical keyboard, a functional key (such as a volume control key or a switch key), a track ball, a mouse, and a joystick.

Figure 11:
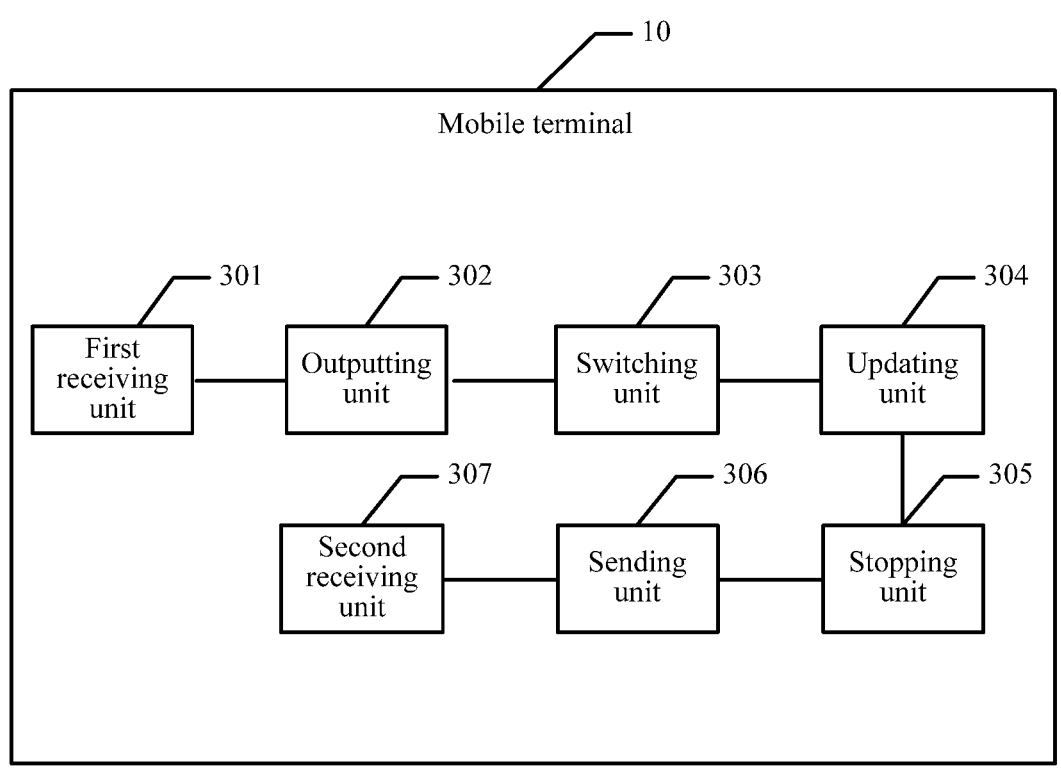
FIG. 11 is another schematic diagram of a mobile terminal according to an embodiment of the present disclosure.

The display unit 840 may be configured to display an application interface. The display unit 840 may include an indicator 841. Optionally, the indicator 841 may be configured by using a liquid crystal display (LCD), an organic light-emitting diode (OLED), or the like. Further, the touch panel 831 may cover the indicator 841. After detecting a touch operation on or near the touch panel 831, the touch panel 831 transfers the touch operation to the processor 880, to determine a type of a touch event. Subsequently, the processor 880 provides corresponding visual output on the indicator 841 based on the type of the touch event. Although, in FIG. 11, the touch panel 831 and the indicator 841 are used as two separate parts to implement input and output functions of the mobile terminal, in some embodiments, the touch panel 831 and the indicator 841 may be integrated to implement the input and output functions of the mobile terminal.

The mobile terminal 800 may further include at least one sensor 850.

The audio circuit 860, a speaker 861, and a microphone 862 may provide audio interfaces between the user and the mobile terminal. The audio circuit 860 may convert received audio data into an electric signal and transmit the electric signal to the speaker 861. The speaker 861 converts the electric signal into a sound signal for output. On the other hand, the microphone 862 converts a collected sound signal into an electric signal. The audio circuit 860 receives the electric signal and converts the electric signal into audio data, and outputs the audio data to the processor 880 for processing. Then, the processor 880 sends the audio data to, for example, another mobile terminal by using the camera 810, or outputs the audio data to the memory 820 for further processing.

The WiFi module 870 may be configured to communicate.

The processor 880 is a control center of the mobile terminal, and is connected to various parts of the mobile terminal by using various interfaces and lines. By running or executing the software program and/or module stored in the memory 820, and invoking data stored in the memory 820, the processor 880 performs various functions and data processing of the mobile terminal, thereby performing overall monitoring on the mobile terminal. Optionally, the processor 880 may include one or more processing units. Preferably, the processor 880 may integrate an application processor and a modem processor. The application processor mainly processes an operating system, a user interface, an application program, and the like. The modem processor mainly processes wireless communication. It may be understood that the foregoing modem processor may alternatively not be integrated into the processor 880.

The mobile terminal 800 further includes the power supply 890 (such as a battery) for supplying power to the components. Preferably, the power supply may be logically connected to the processor 880 by using a power management system, thereby implementing functions such as charging, discharging and power consumption management by using the power management system.

Although not shown in the figure, the mobile 800 may further include a radio frequency (RF) circuit, a Bluetooth module, and the like, which are not described herein.

In one embodiment of the present disclosure, the processor 880 included in the mobile terminal when the mobile terminal performs object scanning further has the following functions:

receiving a first instruction by using a first virtual button in the application interface, the application interface displaying a first scene;

outputting identifiers of to-be-selected operation objects based on the first instruction;

receiving a second instruction, the second instruction indicating a selection of a first identifier from the identifiers of the to-be-selected operation objects, and the first identifier pointing to a first operation object; and switching the first scene displayed by the application interface to a second scene based on the second instruction, the second scene being a scene in which the first operation object is located.

In a possible implementation, after the switching the first scene displayed by the application interface to a second scene based on the second instruction, the processor is further configured to perform:

receiving a third instruction, the third instruction indicating a selection to cancel processing on the first operation object; and switching the second scene displayed by the application interface to the first scene based on the third instruction.

In a possible implementation, after the switching the first scene displayed by the application interface to a second scene based on the second instruction, the processor is further configured to perform:

receiving a fourth instruction; and updating a status attribute value of the first operation object based on the fourth instruction.

In a possible implementation, when the status attribute value of the first operation object is updated based on the fourth instruction, the processor is further configured to perform:

receiving a fifth instruction by using a second virtual button in the application interface, the fifth instruction indicating a selection to stop updating the status attribute value of the first operation object; and stopping updating the status attribute value of the first operation object based on the fifth instruction.

In a possible implementation, after the fifth instruction is received by using the second virtual button in the application interface, the processor is further configured to perform: switching the second scene displayed by the application interface to the first scene based on the fifth instruction, the fifth instruction indicating a selection to stop updating the status attribute value of the first operation object.

In a possible implementation, when the status attribute value of the first operation object is updated based on the fourth instruction, the processor is further configured to perform:

stopping updating the status attribute value of the first operation object when remaining hit points of the first operation object are zero or remaining hit points of a control object of the mobile terminal are zero.

In a possible implementation, the stopping unit 305 is further configured to switch the second scene displayed by the application interface to the first scene when the remaining hit points of the first operation object are zero or the remaining hit points of the control object of the mobile terminal are zero.

In a possible implementation, before the status attribute value of the first operation object is updated based on the fourth instruction, the processor is further configured to perform:

sending synchronization data to a server, so that the server performs a check based on the synchronization data; and receiving a confirmation instruction sent by the server, the confirmation instruction being used for indicating that the synchronization data passes the check performed by the server.

In a possible implementation, the first instruction is an instruction for touching and holding the first virtual button. The second instruction is an instruction for sliding from the first virtual button to the first identifier and touching and holding the first identifier. The fourth instruction is an instruction for loosening a finger from the first identifier. The third instruction is a sliding instruction for sliding to a cancel identifier. The fifth instruction is an instruction for tapping the second virtual button.

An embodiment of the present disclosure further provides a scene switching device based on a mobile terminal, including:

a processor and a memory; and the memory being configured to store program code and transmit the program code to the processor; and the processor being configured to perform, based on an instruction in the program code, the scene switching method based on a terminal according to one embodiment of the present disclosure.

An embodiment of the present disclosure further provides a storage medium, configured to store program code, the program code being used for performing the scene switching method based on a terminal according to the embodiments of the present disclosure.

An embodiment of the present disclosure further provides a computer program product including instructions, the computer program product, when run on a computer, causing the computer to perform the scene switching method based on a terminal according to the embodiments of the present disclosure.

Person skilled in the art may clearly understand that, for the purpose of convenient and brief description, for a detailed working process of the system, apparatus, and unit described above, refer to a corresponding process in the method embodiments, and details are not described herein again.

In the embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communications connections may be implemented by using some interfaces. The indirect couplings or communications connections between the apparatuses or units may be implemented in electronic, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A scene switching method based on a mobile terminal, an application being run on the mobile terminal, the method comprising:
   receiving, by the mobile terminal, a first instruction by triggering a first virtual button in an application interface, the application interface displaying a first scene;
   outputting, by the mobile terminal, one or more icons of one or more to-be-selected operation objects based on the first instruction;
   receiving, by the mobile terminal, a second instruction, the second instruction indicating a selection of a first icon from the one or more icons of the one or more to-be-selected operation objects, and the first icon representing a first operation object;
   receiving, by the mobile terminal, a finger-sliding operation from the first icon to a second icon of the one or more icons;
   showing, by the mobile terminal, a status of a second operation object represented by the second icon;
   switching, by the mobile terminal, the first scene displayed by the application interface to a second scene based on the second instruction, the second scene being a scene in which the first operation object is located, wherein the first scene and the second scene are two different areas of a global map maintained by the application, the first operation object is present in the second scene, and the first operation object is absent in the first scene;
   outputting, by the mobile terminal, a second virtual button along with the one or more icons in response to receiving the first instruction; and
   in response to detecting a triggering of the second virtual button, performing, by the mobile terminal, one or both of:
      cancelling processing on the first operation object; and
      switching the second scene displayed by the application interface to the first scene.

2. The scene switching method according to claim 1, further comprising:
   receiving a third instruction, the third instruction indicating a selection to cancel processing on the first operation object; and
   switching the second scene displayed by the application interface to the first scene based on the third instruction.

3. The scene switching method according to claim 1, further comprising:
   receiving a fourth instruction; and
   updating a status attribute value of the first operation object based on the fourth instruction.

4. The scene switching method according to claim 3, further comprising:
   receiving a fifth instruction, the fifth instruction indicating a selection to stop updating the status attribute value of the first operation object; and
   stopping updating the status attribute value of the first operation object based on the fifth instruction.

5. The scene switching method according to claim 3, further comprising:
   stopping updating the status attribute value of the first operation object upon determining remaining hit points of the first operation object are zero.

6. A mobile terminal, comprising: a memory; and a processor coupled to the memory and configured to:

receive a first instruction by triggering a first virtual button in an application interface of an application, the application interface displaying a first scene;

output one or more icons of one or more to-be-selected operation objects based on the first instruction;

receive a second instruction, the second instruction indicating a selection of a first icon from the one or more icons of the one or more to-be-selected operation objects, and the first icon representing a first operation object;

receive a finger-sliding operation from the first icon to a second icon of the one or more icons;

show a status of a second operation object represented by the second icon;

switch the first scene displayed by the application interface to a second scene based on the second instruction, the second scene being a scene in which the first operation object is located, wherein the first scene and the second scene are two different areas of a global map maintained by the application, the first operation object is present in the second scene, and the first operation object is absent in the first scene;

output a second virtual button along with the one or more icons in response to receiving the first instruction; and in response to detecting a triggering of the second virtual button, perform one or both of:
cancelling processing on the first operation object and
switching the second scene displayed by the application interface to the first scene.

7. The mobile terminal according to claim 6, wherein the processor is further configured to:
receive a third instruction, the third instruction indicating a selection to cancel processing on the first operation object; and
switch the second scene displayed by the application interface to the first scene based on the third instruction.

8. The mobile terminal according to claim 6, wherein the processor is further configured to:
receive a fourth instruction; and
update a status attribute value of the first operation object based on the fourth instruction.

9. The mobile terminal according to claim 8, wherein the processor is further configured to:
receive a fifth instruction, the fifth instruction indicating a selection to stop updating the status attribute value of the first operation object; and
stop updating the status attribute value of the first operation object based on the fifth instruction.

10. A non-transitory computer-readable storage medium storing computer program instructions executable by at least one processor to perform:
receiving a first instruction by triggering a first virtual button in an application interface of an application, the application interface displaying a first scene;
outputting one or more icons of one or more to-be-selected operation objects based on the first instruction;
receiving a second instruction, the second instruction indicating a selection of a first icon from the one or more icons of the one or more to-be-selected operation objects, and the first icon representing a first operation object;
receiving a finger-sliding operation from the first icon to a second icon of the one or more icons;
showing a status of a second operation object represented by the second icon; and
switching the first scene displayed by the application interface to a second scene based on the second instruction, the second scene being a scene in which the first operation object is located, wherein the first scene and the second scene are two different areas of a global map maintained by the application, the first operation object is present in the second scene, and the first operation object is absent in the first scene;
outputting a second virtual button along with the one or more icons in response to receiving the first instruction; and
in response to detecting a triggering of the second virtual button, performing one or both of:
cancelling processing on the first operation object; and
switching the second scene displayed by the application interface to the first scene.

11. The storage medium according to claim 10, wherein the computer program instructions further cause the at least one processor to perform:
receiving a third instruction, the third instruction indicating a selection to cancel processing on the first operation object; and
switching the second scene displayed by the application interface to the first scene based on the third instruction.

12. The scene switching method according to claim 1, wherein triggering the virtual button in the application interface includes touching and holding the first virtual button.

13. The mobile terminal according to claim 6, wherein triggering the virtual button in the application interface includes touching and holding the first virtual button.

14. The storage medium according to claim 10, wherein triggering the virtual button in the application interface includes touching and holding the first virtual button.

15. The scene switching method according to claim 1, wherein the first icon or the second icon is presented as a character enclosed in a circle.

16. The method according to claim 1, further comprising:
sending synchronization data to a server for the server to perform a check based on the synchronization data;
receiving a confirmation instruction from the server, the confirmation instruction indicating that the synchronization data passes the check performed by the server; and
forwarding game data to another mobile terminal by using the server.

17. The method according to claim 1, wherein an area of the global map other than the first scene or the second scene is not displayed by the mobile terminal.

* * * * *